United States Patent [19]

Kondo et al.

[11] Patent Number: 4,643,623

[45] Date of Patent: * Feb. 17, 1987

[54] HOLDER FOR ROTARY CUTTING TOOLS

[75] Inventors: Kunio Kondo; Katutoshi Haga, both of Toyota; Tadashi Kurumiya, Okazaki; Minoru Haga, Toyota; Yasuo Kato, Toyota; Shinobu Kaneko, Toyota, all of Japan

[73] Assignees: Fuji Seiko Limited; Toyota Jidosha Kabushiki Kaisha, both of Aichi, Japan

[ * ] Notice: The portion of the term of this patent subsequent to Feb. 10, 2004 has been disclaimed.

[21] Appl. No.: 625,960

[22] Filed: Jun. 29, 1984

[30] Foreign Application Priority Data

Jul. 12, 1983 [JP] Japan ................................. 58-126768

[51] Int. Cl.$^4$ .............................................. B23C 5/26
[52] U.S. Cl. ................................ 409/232; 408/147; 408/156; 408/239 R; 409/234
[58] Field of Search ................... 408/56, 57, 59, 129, 408/130, 131, 146, 186, 190, 191, 193, 198, 238, 239 R, 159, 180, 147, 187; 409/231, 232, 233, 234; 279/1 Q

[56] References Cited

U.S. PATENT DOCUMENTS

| 1,452,921 | 4/1923 | McClellan | 408/47 |
|---|---|---|---|
| 3,138,997 | 6/1964 | Bruckner | 409/233 |
| 3,279,268 | 10/1966 | Zagar | 74/63 |
| 3,296,898 | 1/1967 | Osburn, Jr. | 408/159 X |
| 3,369,820 | 2/1968 | Lehmkuhl | 409/232 X |
| 3,407,703 | 10/1968 | Guidi et al. | 409/191 |
| 3,677,560 | 7/1972 | Clarkson | 409/232 X |
| 3,687,564 | 8/1972 | Cupler | 408/47 |
| 3,753,624 | 8/1973 | Walker et al. | 408/159 |
| 4,014,622 | 3/1977 | Lotz | 279/1 Q |
| 4,072,083 | 2/1978 | Cesal | 409/232 |
| 4,396,320 | 8/1983 | Bellmann et al. | 408/159 X |
| 4,422,653 | 12/1983 | Piotrowski | 279/1 Q |
| 4,451,185 | 5/1984 | Yamakage | 408/180 X |

FOREIGN PATENT DOCUMENTS

| 55-15946 | 4/1980 | Japan | 408/56 |
|---|---|---|---|
| 0107835 | 6/1984 | Japan | 409/232 |

Primary Examiner—Gil Weidenfeld
Assistant Examiner—Glenn L. Webb
Attorney, Agent, or Firm—Parkhurst & Oliff

[57] ABSTRACT

A holder for a rotary cutting tools has a holder body fixed to a spindle of a machine tool. A rotatable shaft concentric with the holder body and having a tool-mounting portion at one end thereof is coupled at its other end portion to the holder body to receive torque from the holder body. The rotatable shaft is so mounted as to be radially displaceable and inclinable relative to the holder body. A positioning member is fixedly disposed on the machine tool body radially outwardly of the spindle. A cylindrical casing disposed radially outwardly of and rotatably engaged with the rotatable shaft such that the casing and the shaft are rotatable relative to each other, the casing being engageable with the positioning member for accurate positioning thereof by the positioning member, and thereby positioning the rotatable shaft. The holder may further have a circumferential lock mechanism for locking the casing and the holder body to prevent relative rotation between the casing and the holder body when the holder is not attached to the spindle, and for allowing relative rotation after the holder has been attached to the spindle.

28 Claims, 6 Drawing Figures

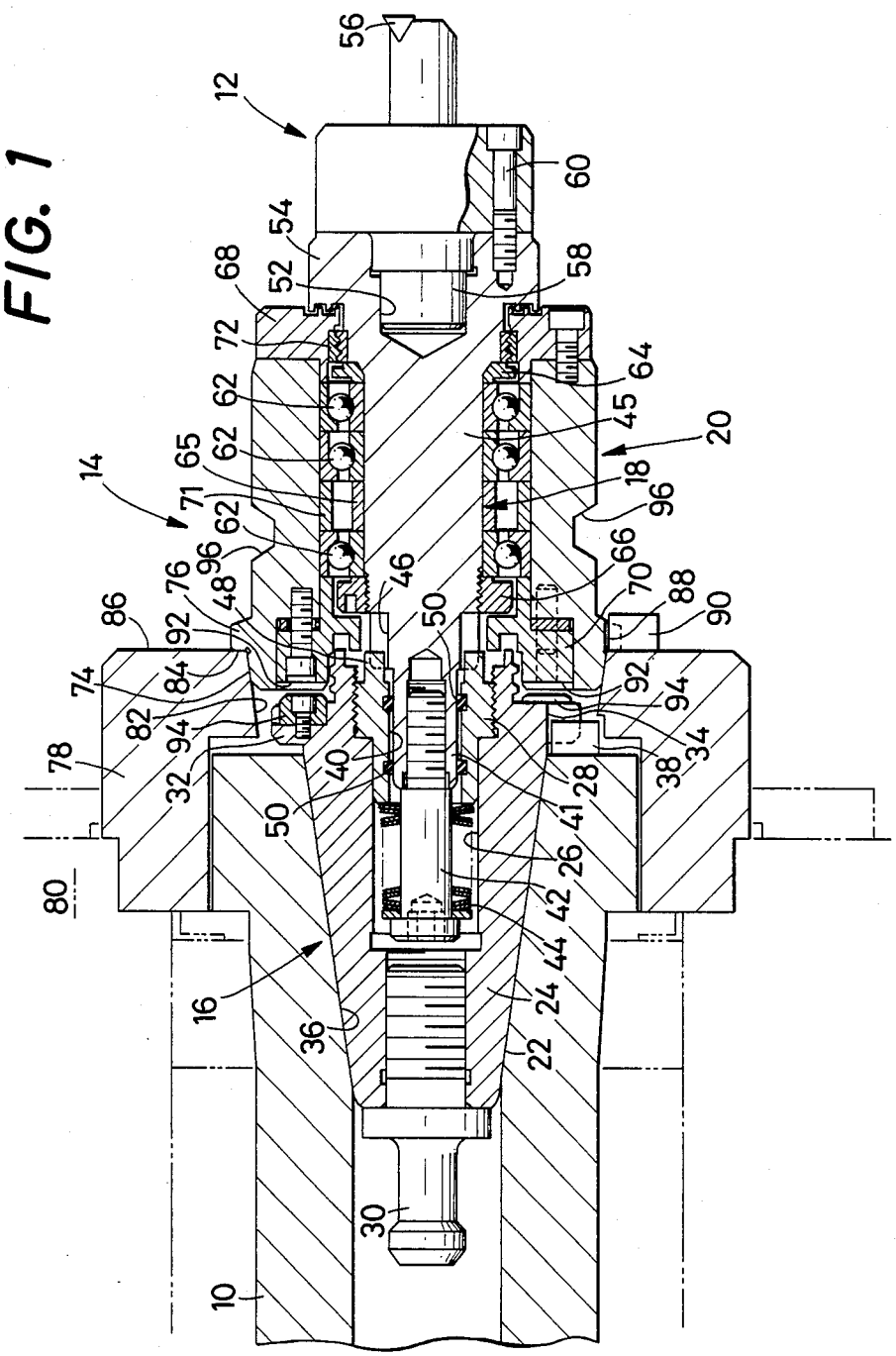

HOLDER FOR ROTARY CUTTING TOOLS

BACKGROUND OF THE INVENTION

The present invention relates generally to a cutter holder attached to a spindle of a machine tool for supporting a cutting tool rotated by the spindle. More particularly, the invention is concerned with such a holder for a rotary cutting tool, which causes minimum decrease in accuracy of machining by the tool due to a positioning error of the holder with respect to the machine spindle.

Various tool holders have been used for mounting drills, milling cutters, reamers, boring bars and other rotary cutting tools on spindles of machine tools such as drilling, milling and boring machines, and machining centers which are capable of automatically performing multiple kinds of cutting operations. Such a tool holder supports a tool at its one end portion, and is adapted to be removably fixed to the machine spindle at the other end portion. An example of the known tool holders is illustrated in FIG. 6.

In the figure, a tool holder 2 is mounted on a spindle 1 of a machining center. The tool holder 2 carries a fine-boring bar 4 mounted at one end thereof, and has a pull stud 5 fixed to the other end. The holder 2 has a taper shank 6 adjacent to the end on the side of the pull stud 5. The tool holder 2 is automatically mounted on the spindle 1 by means of a tool changer arm (not shown) such that the taper shank 6 fits in a mating tapered bore 7 formed in the spindle 1. With the shank 6 inserted in the spindle bore 7, the pull stud 5 engages a drawing-rod or draw bar (not shown) incorporated in the spindle 1, and the tool holder 2 is pulled by the draw bar inwardly of the spindle bore, whereby the tapered surface of the shank 6 is brought into close contact with the inner tapered surface 7 of the spindle 1. Thus, the tool holder 2 is secured to the spindle 1 with a high positioning accuracy.

However, the tapered surface of the shank 6 and the mating tapered surface 7 of the spindle are liable to wear due to frequent mounting and dismounting of tool holders for a variety of tools for the machining center. Further, these tapered surfaces are subject to cutting chips, dust and dirt, and other foreign matters. As a result, the tapered shank 6 does not always make a sufficiently snug fit in the tapered bore 7. Thus, it has been difficult or impossible to avoid a positioning error of the tool holder 2 due to misalignment or inclination of its centerline with respect to the centerline of the spindle 2. This positioning error or misalignment of the tool holder 2 results in an increase in run-out of the boring bar 4 at the free end of the holder 2, and consequently leads to machining errors such as an oversize of a bore diameter to be bored by the boring bar 4. That is, the positioning error of the tool holder 2 lowers the accuracy of machining with the tool 4.

The above indicated positioning error of a tool holder will give rise to serious trouble, particularly in fine-boring, reaming and other machining operations which require a relatively high accuracy. For this reason, such a high-accuracy machining operation has been performed in many cases on a special-purpose or single-purpose machine, and not on a machining center which utilizes a variety of cutting tools.

SUMMARY OF THE INVENTION

It is accordingly an object of the present invention to provide a holder for rotary cutting tools, which is capable of minimizing a decrease in accuracy of machining by the tools due to an error of positioning of the holder relative to the machine spindle.

According to the invention, there is provided a holder for holding a rotary cutting tool, attachable to a spindle of a machine tool for rotary cutting movement of the cutting tool by the spindle, comprising:

(1) a holder body fixed to the spindle for rotation thereof about an axis of the spindle;

(2) a rotatable shaft disposed concentrically with the holder body and having a tool-mounting portion at one end thereof, the rotatable shaft being coupled at the other end portion thereof to the holder body for receiving a torque from the holder body, the rotatable shaft being displaceable relative to the holder body;

(3) a positioning member fixedly disposed radially outwardly of the spindle; and (4) a cylindrical casing disposed radially outwardly of the rotatable shaft such that the casing and the shaft are rotatable relative to each other, the casing being engageable with the positioning member for accurate positioning thereof by the positioning member, and thereby positioning the rotatable shaft, while the holder body is fixed to the spindle.

In the above arrangement, the rotatable shaft with a rotary cutting tool fixed to one end thereof is positioned by the casing which is accurately positioned by the positioning member disposed fixedly around the outer circumference of the free end of the spindle. Accordingly, a possible misalignment of the holder body with respect to the spindle due to worn-out contact or positioning surfaces of the holder body and the spindle or due to accumulation of chips or dirts on the contact surfaces, will be less likely to affect a machining accuracy of the cutting tool carried by the rotatable shaft. In other words, a high-precison machining is possible provided that the holder body coupled to the rotatable shaft can be driven by the spindle. However, a cutting operation which does not require a high machining accuracy may be performed without the use of the positioning member for positioning the casing. In such case, the alignment of the cutting tool with the spindle is effected simply by means of a conventional engagement of the tapered shank of the holder with the tapered bore in the spindle. Thus, the engaging and disengaging actions of the casing on the positioning member take place only when the cutting operation requires a high precision. This means a longer service life of the contact surfaces of the casing and the positioning member, thereby minimizing a positioning error of the casing due to wear of the contact surfaces. Further, even if a misalignment of the casing with respect to the positioning member occurs due to wear of the contact surfaces or due to accumulation of foreign matters on the contact surfaces, such a misalignment of the casing is less likely to affect the machining accuracy (such as a diameter of a bore to be cut) because the casing is not rotated with the rotatable shaft.

According to an advantageous form of the invention, the holder further comprises (5) a circumferential lock mechanism disposed in association with the casing and the holder body, for preventing a relative rotation between the casing and the holder body while the holder is not attached to the spindle, the lock mechanism allowing the above relative rotation after the holder has been attached to the spindle.

In this advantageous form of the invention, the casing for rotatably positioning the rotatable shaft, and the holder body to which the rotatable shaft is coupled, are circumferentially locked by the circumferential lock mechanism, and thereby prevented from rotating relative to each other, while the holder is not mounted on the spindle. Upon mounting of the holder on the spindle (upon insertion of the holder body into the spindle), the positioning member positions the casing, and concurrently the lock mechanism is operated to release the circumferential lock of the casing and the holder body for rotation of the holder body relative to the casing which is fixed to the positioning member, whereby the rotation of the spindle is transmitted to the rotatable shaft through the holder body.

Thus, the tool holder with the above described lock mechanism provides an additional advantage that the holder body and the casing are maintained at a predetermined circumferential angular position relative to each other. This feature of constant angular position of the holder body and the casing relative to each other is particularly important when the tool holder is used for a machining center wherein mounting and dismounting of the tool holder is automatically effected by a changer arm which grips the tool holder and orients the holder body at a predetermined angular position relative to the spindle.

Obviously, the tool holder of the invention is equally usable for rotary cutting tools for use on machine tools other than machining centers, such as drilling, boring, or milling machines, and special- or single-purpose machine tools.

According to a preferred embodiment of the invention, the holder body comprises: a shank member which is engageable with a bore formed in the spindle, and which has an axial hole concentric with the shank member; and an annular torque member for transmitting a torque from the shank member to the rotatable shaft, the torque member having a central through-hole and being fixed in the axial hole of the shank member such that the central through-hole of the torque member is concentric with the axial hole of the shank member. The other end portion of the rotatable shaft at which it is coupled to the holder body, comprises a small-diameter portion which extends through the central through-hole of the torque member with a slight radial clearance therebetween. This radial clearance serves to allow a slight degree of inclination and radial displacement of an axis of the rotatable shaft with respect to the axis of the shank member.

In one form of the above preferred embodiment, at least two elastic rings such as O-rings are disposed in the above indicated radial clearance such that the rings are held in contact with the outer surface of the small-diameter portion and with the inner surface of the central through-hole of the torque member. In another form of the above embodiment, a pair of elastic rings are disposed so as to sandwich the torque member. One of the elastic rings is disposed in pressed contact with the torque member and a large-diameter portion of the rotatable shaft adjacent to the small-diameter portion, and the other ring is disposed in pressed contact with the torque member and an annular member fixed to the end of the small-diameter portion of the shaft.

In either one of the above two arrangements, the elastic rings prevent otherwise possible rattling movements of the small-diameter portion in the central through-hole in the torque member, and further serve to hold the small-diameter portion in concentric relation with the torque member (shank member), while the holder is not attached to the spindle. Further, the elastic rings allow a slight degree of inclination and radial displacement of the rotatable shaft with respect to the shank member, while the holder is attached to the spindle.

According to a further preferred embodiment, the end face of the large-diameter portion of the rotatable shaft has at least one cutout which engages the corresponding at least one protrusion provided on the torque member, in order to transmit a torque from the shank member to the rotatable shaft via the torque member.

According to an embodiment alternative to the above embodiment, the small-diameter portion of the rotatable shaft has a pair of opposite flat surfaces, and the central through-hole of the torque member has a cross sectional configuration corresponding to that of the small-diameter portion of the shaft, whereby the torque is transmitted from the torque member to the rotatable shaft.

According to another preferred embodiment of the invention, biasing means is disposed between the holder body and the rotatable shaft to bias the holder body and the rotatable shaft toward each other. The holder body is axially movable by a slight distance against a biasing force of the biasing means away from the rotatable shaft after the cylindrical casing has engaged the positioning member, whereby the casing is held in pressed engagement with the positioning member. Preferably, coned disc springs may be used as the biasing means.

According to a further preferred embodiment of the invention, the casing and the positioning member have tapered surfaces which are complementary with each other, and further have opposite abutment faces which are perpendicular to the axis of the casing. These tapered surfaces and abutting faces of the casing and the positioning member engage each other to position the casing with respect to the positioning member and consequently position the rotatable shaft when the holder is attached to the spindle. Preferably, the above engagements of the tapered surfaces and of the abutment faces are achieved with surface pressures produced by a resilient force of the above indicated biasing means.

According to an alternative embodiment in place of the above embodiment, the casing is provided with a plurality of first positioning means circumferentially spaced from each other, and the positioning member is provided with a plurality of second positioning means disposed radially outwardly of the spindle. The first and second positioning means engage each other to position the casing when the holder is attached to the spindle. In one form of the above alternative embodiment, the first positioning means comprises plural engagement pins fixed to the casing so as to extend along the axis of the casing, and the second positioning means comprises plural holes engageable with the engagement pins.

According to another advantageous embodiment of the invention, the casing is positioned circumferentially with respect to the casing, through engagement of a cutout on the casing with a protrusion on the positioning member.

According to a still further embodiment of the invention, the tool-mounting portion of the rotatable shaft has a tool-insertion hole formed axially of the shaft, so as to accommodate a shank of the cutting tool. In a preferred form of this embodiment, a sleeve is fixed in the tool-insertion hole. The sleeve has a thin-walled portion which cooperates with an inner surface of the tool-insertion hole to define a hydraulic chamber, so that the thin-walled portion is pushed radially inwardly, upon increase in pressure in the hydraulic chamber, to grip the shank of the tool.

In accordance with one form of the circumferential lock mechanism previously indicated, the mechanism comprises a claw clutch disposed between the casing and the holder body, and biasing means for biasing the casing and the holder body toward each other for engagement of the claw clutch while the holder is not attached to the spindle. The biasing means permits the claw clutch to be disengaged when the holder has been attached to the spindle. The claw clutch may preferably comprise plural recesses on one of the casing and the holder body, and plural mating engagement dogs provided on the other of the casing and the holder body.

In accordance with an alternative form of the circumferential lock mechanism, the mechanism comprises: a pin which is supported slidably along the axis of the casing; a spring acting on one end of the pin to bias the pin toward its projected position at which the other end thereof engages the holder body while the holder is not attached to the spindle; and a stopper which abuts on the other end of the pin at the projected position, when the holder is attached to the spindle.

In a preferred arrangement of the above alternative form, the pin is adapted to engage a cutout which is formed in an annular flange portion of the holder body radially outwardly extending from an outer circumferential surface at one end portion of the holder body to which the rotatable shaft is coupled. Preferably, the above cutout is also used for engagement with a boss which is provided on the end face of the spindle for circumferential lock of the holder body to the spindle.

According to a preferred form of the circumferential lock mechanism, the stopper is fixed to the positioning member.

BRIEF DESCRIPTION OF THE DRAWING

The above and other objects, features and advantages of the present invention will be better understood from reading the following description of the preferred embodiments taken in connection with the accompanying drawings in which:

FIG. 1 is an elevational view in cross section of one embodiment of a holder for rotary cutting tools of the present invention, which is mounted on a spindle of a machining center;

DETAILED DESCRIPTION OF THE PREFERRED EMBODIMENTS

Figure 6:
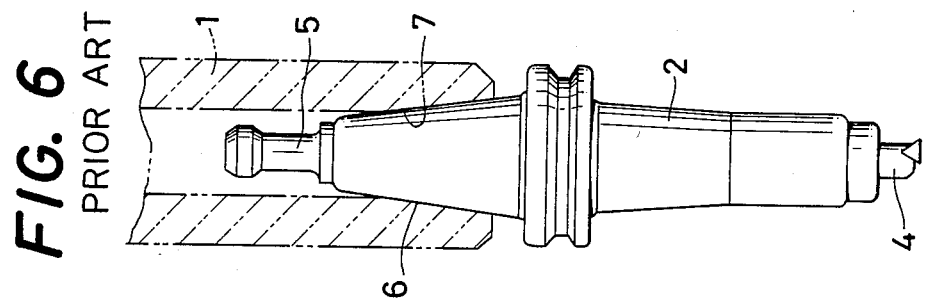
FIG. 6 is an elevational view, partly in cross section, of an example of a known holder for rotary cutting tools.

To further clarify the present invention, some preferred embodiments of a tool holder as applied to rotary cutting tools for a machining center will be described in greater detail, referring to FIGS. 1-5.

In FIG. 1, reference numeral 10 designates a cylindrical spindle 10 of a machining center, which is rotated about its axis. To a free end of the spindle 10 is attached a tool holder 14 for holding a rotary cutting tool, e.g., a fine-boring tool 12. The tool holder 14 imparts rotary movements of the spindle 10 to the tool 12.

The tool holder 14 comprises a holder body 16 removably fixed to the spindle 10, a rotatable shaft 18 disposed concentrically with the holder body 16, and a generally cylindrical casing 20 disposed radially outwardly of the shaft 18 for positioning the shaft 18. The tool 12 is removably fixed to one axial end portion of the rotatable shaft 18. The shaft 18 is coupled, at the other axial end portion, to the holder body 16.

The holder body 16 comprises a shank member 24 and a torque member 28. The shank member 24 has an outer tapered surface 22 and an axial hole 26 formed through a radially central portion of the shank member 24. The torque member 28 is threaded into a part of the axial hole 26 corresponding to a relatively large diameter portion of the shank member 24. A pull stud 30 is fixed to the small-diameter end portion of the shank member 24 such that the stud 30 extends from the shank member 24 in the axial direction. The shank member 24 includes an annular flange portion 32 which protrudes radially outwardly from the outer circumference at its large-diameter end, and perpendicularly to the axis of the shank member 24. The annular flange portion 32 has a cutout (key slot) 34 which receives or engages a boss (drive key) 38 provided on the end face of the spindle 10, in order to prevent relative rotation between the spindle 10 and the shank member 24 when the holder body 16 has been sufficiently pulled into the spindle 10, that is, when the outer tapered surface 22 of the shank member 24 has come into close contact with an inner tapered surface 36 which defines a tapered bore (36) formed in the free end portion of the spindle 10.

The torque member 28 has a central through-hole 40 which accommodates a concentric small-diameter portion 41 of the rotatable shaft 18 with a small annular radial clearance. That is, the rotatable shaft 18 is stepped at its axially intermediate portion to provide the concentric small-diameter portion 41 which is concentrically received in the through-hole 40 which is concentric with the axial hole 26 in the shank member 24. A bolt 42 is threaded at one end thereof to the small-diameter portion 41 of the rotatable shaft 18 such that the other end portion with a head extends into the axially inner part of the axial hole 26 in an axial direction away from the end of the small-diameter portion 41. Belleville or coned disc springs 44 are disposed between the head of the bolt 42 and the end of the torque member 28, to bias the rotatable shaft 18 in a direction toward the torque member 28. In other words, the rotatable shaft 18 and the torque member 28 are coupled to each other so that they are movable axially relative to each other against a resilient force of the coned disc springs 44. Further, the above indicated small radial clearance between the outer surface of the small-diameter portion 41 of the rotatable shaft member 18 and the inner surface of the torque member 28 will allow a small degree of inclination and radial displacement of axes of the two members 18 and 28 relative to each other. Adjacent the small-diameter portion 41, there is provided a large diameter portion 45 which has, in its end face opposite to the torque member 28, cutouts 46 formed parallel to the axis of the rotatable shaft 18. These cutouts 46 engage protrusions 48 provided on the annular end face of the torque member 28. With the engagement of the cutouts 46 with the protrusions 48, a rotary movement of the shank member 24 imparted from the spindle 10 is faithfully transmitted to the rotatable shaft 18 through the torque member 28.

To prevent loosening of the torque member 28 in the shank member 24 due to rotation of the shank member 18, the torque member 28 is screwed in the shank member 24 in a direction which is opposite to the direction of rotation of the shank member 24 (spindle 10). Two elastic O-rings 50 are disposed in the radial annular clearance left in the through-hole 40, in spaced-apart relation with each other along the axis of the small-diameter portion 41, such that the elastic O-rings 50 are held in contact with the outer surface of the small-diameter portion 41 and the inner surface defining the through-hole 40. The O-rings 50 protect the rotatable shaft 18 against otherwise possible rattling movements.

The rotatable shaft 18 has, at a free end thereof opposite to the small-diameter portion 41, a tool-mounting portion 54 in which a tool-insertion hole 52 is formed along the axis of the shaft 18. The boring tool 12 comprises a boring bar which has a shank 58 at one end portion thereof, and which carries a boring insert 56 fixed to a free end opposite to the shank 58. When the boring tool 12 is mounted on the tool-mounting portion 54, the shank 58 of the tool 12 is first inserted into the tool-insertion hole 52 for accurate radial positioning of the tool relative to the axis of the rotatable shaft 18, and then the tool 12 is held in abutting contact with the end face of the tool-mounting portion 54 with fixing bolts 60.

The casing 20 for positioning the rotatable shaft 18 has a cylindrical bore through which the rotatable shaft 18 is supported rotatably relative to the casing 20 via three ball bearings 62 fitting on the large-diameter portion 45 of the rotatable shaft 18. The three ball bearings 62 are spaced from each other axially of the rotatable shaft 18. The inner races of the bearings 62 are fixed to the rotatable shaft 18 by means of spacers 64 and 65, and a nut 66, while the outer races are fixed to the casing 20 by means of a pair of annular bearing retainers 68, 70, and a spacer 71. Between the bearing retainer 68 and the rotatable shaft 18, there is disposed a labyrinth ring 72 for protecting the bearings 62 against entry of dust and dirt or other foreign matters.

At the end of the casing 20 at which the bearing retainer 70 is disposed, there is provided a tapered nose having an outer circumferential surface 74 which is tapered such that the outside diameter decreases in a direction toward the nose end, i.e., toward the holder body 16. The casing 20 has an annular flange portion 76 which extends radially outwardly from the large diameter end of the tapered nose (74), perpendicularly to the axis of the casing 20. On the other hand, the tool holder 14 further comprises an annular positioning member 78 which is secured to a body 80 of the machining center so as to surround the free end portion of the spindle 10. The positioning member 78 has a tapered bore which is defined by an inner circumferential tapered surface 82. This tapered surface (tapered bore) 82 is complementary to the outer circumferential tapered surface (tapered nose) 74 of the casing 20. In this arrangement, the tapered nose 74 of the casing 20 fits into the tapered bore 82 of the positioning member 78, that is, the outer and inner complementary tapered surfaces 74 and 82 are brought into contact with each other, when the holder body 16 is inserted into the tapered bore 36 in the spindle 10. With the tapered surfaces 74 and 82 contacting each other, an end face 84 of the annular flange portion 76 is held in abutting contact with an end face 86 of the positioning member 78. These end faces 84 and 96, which are perpendicular to the axis of the casing 20, serve as opposite abutment faces for axial positioning of the casing 20. Thus, the casing 20 is accurately positioned and fixed in both radial and axial directions by means of, and with respect to, the positioning member 78.

As previously indicated, the holder body 16 and the casing 20 are biased toward each other by the coned disc springs 44. Upon insertion of the holder body 16 into the spindle 10 in a manner which will be described, the casing 20 is first brought into contact with the positioning member 78. Then, the holder body 16 is slightly displaced axially against the biasing force of the springs 44 relative to the casing 20 when the holder body 16 inserted in the spindle 10 is pulled inwardly at the pull stud 30 by the draw bar, whereby the holder body 16 is finally held in place in contact with the tapered bore 36 in the spindle 10. Stated the other way, the tapered surfaces 74 and 82 are brought into a slightly interfering fit with each other, with the abutment faces 84 and 96 abutting on each other, when the holder body 16 has been inwardly pulled by a small distance by the draw bar. Thus, the casing 20 is kept in pressed contact with the positioning member 78 by surface pressures produced by the biasing force of the coned disc springs 44 while the holder body 16 is installed in place in the spindle 10, i.e., after the holder has been attached to the spindle 10. The annular flange portion 76 of the casing 20 has a cutout 88 which engages a protrusion 90 provided on the end face 86 of the positioning member 78, so that the rotation of the casing 20 is prevented while the spindle 10, holder body 16 and rotatable shaft 18 are driven, as will be described later.

The bearing retainer 70 fixed to the casing 20 has a plurality of recesses 92 in its end face opposite to the end face of the annular flange portion 32 of the shank member 24. On the end face of the flange portion 32, there are fixed a plurality of engagement dogs 94 which are engageable with the corresponding recesses 92. These recesses 92 and engagement dogs 94 constitute a kind of dog clutch or claw clutch. This claw clutch cooperates with the coned disc springs 44 to form a circumferential lock mechanism or means for preventing a relative rotation between the holder body 16 and the casing 20.

Stated in more detail, the engagement dogs 94 are forced into engagement with the recesses 92 by the coned disc springs 44 when the tool holder 14 is dismounted from the spindle 10. That is, the claw clutch 92, 94 prevents the holder body 16 and the casing 20 from rotating relative to each other while the tool holder 14 is not mounted on the spindle 10. When the tool holder 14 is mounted in place on the spindle 10, however, the holder body 16 is axially pulled a slight distance away from the casing 20 against the biasing force of the coned disc springs 44, the claw clutch is released with the engagement dogs 94 disengaging from the respective recesses 92, thereby permitting a relative rotation of the holder body 16 and the casing 20. Accordingly, the tool holder 14 is mounted on the spindle 10 while the engagement dogs 94 are held in engagement with the recesses 92. For holding the tool holder 14 by the tool changer arm of the machine, the casing 20 has an annular groove 96 with which a gripper of the tool changer arm engages to grip the tool holder 14 and transfer the same to the spindle 10. In mounting the tool holder 14 on the spindle 10, the tool changer arm holds the tool holder 14 and inserts its holder body 16 in the spindle bore. Then, the tool holder 14 is pulled at the pull stud 30 by the draw bar until the shank member 14 completely fits in the tapered bore 36 in the spindle 10. At this time, the boss 38 on the spindle 10 engages the cutout 34 in the annular flange portion 32 of the shank member 24, and the protrusion 90 on the positioning member 78 engages the cutout 88 in the annular flange portion 76 of the casing 20. To allow these engagement actions, the spindle 10 is adapted to be stopped at a predetermined position by a spindle orientation device incorporated in the machining center.

In the tool holder 14 constructed as described hitherto, the rotatable shaft 18 to which the boring tool 12 is fixed may be positioned with high precision by means of the casing 20 which is positioned by the positioning member 78. Further, the rotatable shaft 18 and the holder body 16 are coupled to each other such that the shaft 18 may be displaced to a small extent relative to the holder body 16 fixed to the spindle 10. As a result, the boring tool 12 can be positioned with high accuracy irrespective of the positioning or mounting accuracy of the holder body 16 with respect to the spindle 10. Hence, the present embodiment of the tool holder 14 permits a sufficiently high machining accuracy even in a fine boring operation on a machining center.

Figure 2:
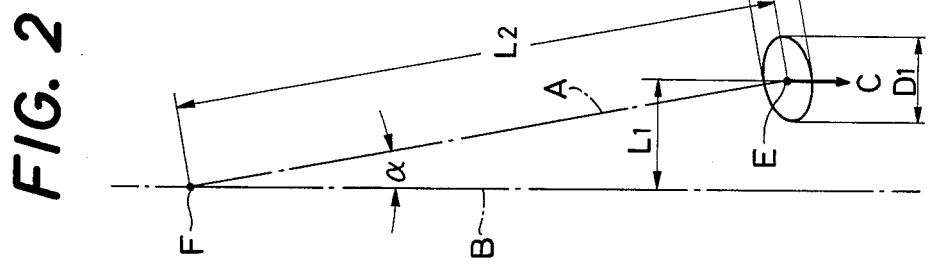
FIG. 2 is a diagrammatic view illustrating operational advantages of the tool holder of FIG. 1.

Although there may be a slight error in positioning of the casing 20 relative to the positioning member 78 due to dimensional errors of the outer tapered surface 74 and end face 84 of the casing 20, and the inner tapered surface 82 and end face 86 of the positioning member 78, and due to accumulation of dust and dirt on these positioning surfaces, such a positioning error of the casing 20 will have substantially no adverse effect on the machining accuracies such as a diameter of a bore to be cut by the boring tool 12. The reason is as follows:

Referring to FIG. 2, reference characters A and B indicate centerlines of the rotatable shaft 18 and the spindle 10, respectively. The centerline A of the rotatable shaft 18 is inclined by an angle $\alpha$ with respect to the centerline B of the spindle 10, due to a positioning error of the casing 20. If a boring operation is performed with the rotatable shaft 18 inclined at the angle $\alpha$, the thus inclined rotatable shaft 18 is fed in a direction indicated by arrow C, i.e., parallel to the centerline B, whereby a bore to be cut is made elliptical with a diameter $D_1$ smaller than a diameter $D_2$. For example, assuming that an offset distance $L_1$ of a center E of a cutting path circle of the boring insert 56 is 0.0062 mm, and that a distance between the center E and a rear end position F of the rotatable shaft 18 is 200 mm, the inclination angle $\alpha$ is calculated to be approximately 0°0'6" (six seconds). This value will create only a very small ellipticity ($D_1/D_2$) of the bore to be obtained, which ellipticity is almost negligible, provided a diameter of the above indicated cutting path circle (circular path taken by the cutting edge of the insert 56) is not less than about 100 mm. Thus, the ellipticity caused by such a small inclination angle $\alpha$ will have substantially no adverse effect on the machining accuracy. The above arrangement according to the invention is in sharp contrast with a traditional tool holder arrangement wherein a rotatable shaft, if inclined by an angle $\alpha$ to the spindle centerline B, is rotated about this centerline B, with a result of causing a considerable increase in diameter of a bore to be cut. Therefore, such a traditional tool holder is not suitable for fine-boring or other machining operations which require a very high accuracy. It is noted that the distance $L_1$ in FIG. 2 is shown in an extremely enlarged size relative to the distance $L_2$, for easier understanding of the subject matter in question.

Other embodiments of a tool holder of the invention will be described hereunder, with reference to FIGS. 3-5 wherein the same reference numerals as used in FIG. 1 are used to identify the components which correspond to those of FIG. 1 with or without minor changes.

Figure 3:
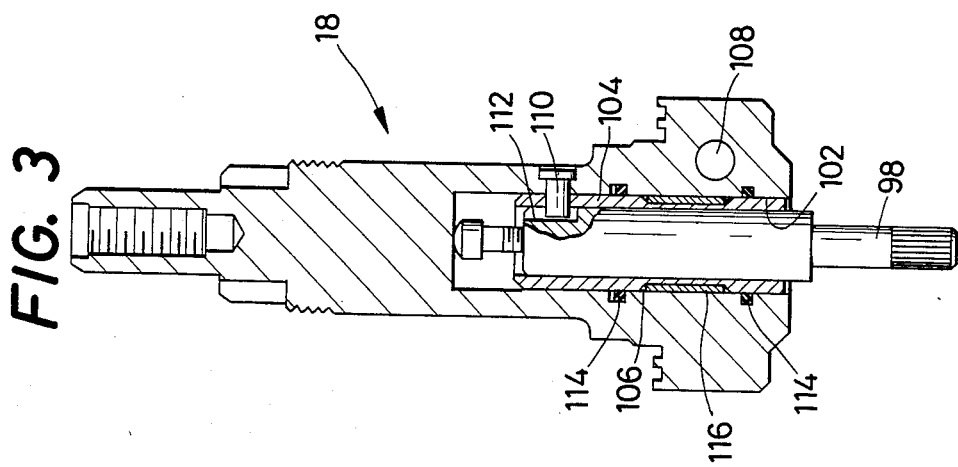
FIG. 3 is an elevational view in cross section of a part of another embodiment of the invention, showing a rotatable shaft with a reamer attached thereto.

There is shown in FIG. 3 a modified form of a rotatable shaft 18 on which is mounted a reamer 98. The rotatable shaft 18 has an axial mounting hole 102 in which a sleeve 104 fits. The sleeve 104 has, in an axially intermediate portion thereof, a thin-walled portion which cooperates with an inner surface of the hole 102 to define a hydraulic chamber 106. This chamber 106 is filled with a working fluid. Upon inward movement of a piston 108 with a threaded member (not shown), a pressure in the hydraulic chamber 106 is increased and the thin-walled portion of the sleeve 104 is pushed radially inwardly toward the axis of the sleeve 104, whereby a shank of the reamer 98 is gripped by the thin-walled portion of the sleeve 104. A pin 110 is press-fitted in a radial hole in the rotatable shaft 18 such that the pin 110 extends radially inwardly through the walls of the shaft 18 and the sleeve 104 toward the centerline of the mounting hole 102. A free end of the pin 110 engages a key slot 112 formed axially in the outer surface of the reamer 98 when the reamer 98 is inserted into the sleeve 104, whereby a rotation of the reamer 98 relative to the rotatable shaft 18 is prevented. Numeral 114 designates sealing members for maintaining the hydraulic chamber 106 in a fluid-tight condition, and numeral 116 indicates a spacer for reducing a volume of the chamber 106.

The above form of the rotatable shaft 18 wherein the reamer 98 is gripped by a so-called hydraulic chuck using a pressurized fluid, permits a slight displacement of the reamer 98 relative to the rotatable shaft 18 positioned by the casing 20. This arrangement enables the reamer 98 to follow a hole to be reamed, even if the reamer 98 has a slight misalignment with the hole due to a positioning error of the casing 20 or for other reasons.

Figure 4:
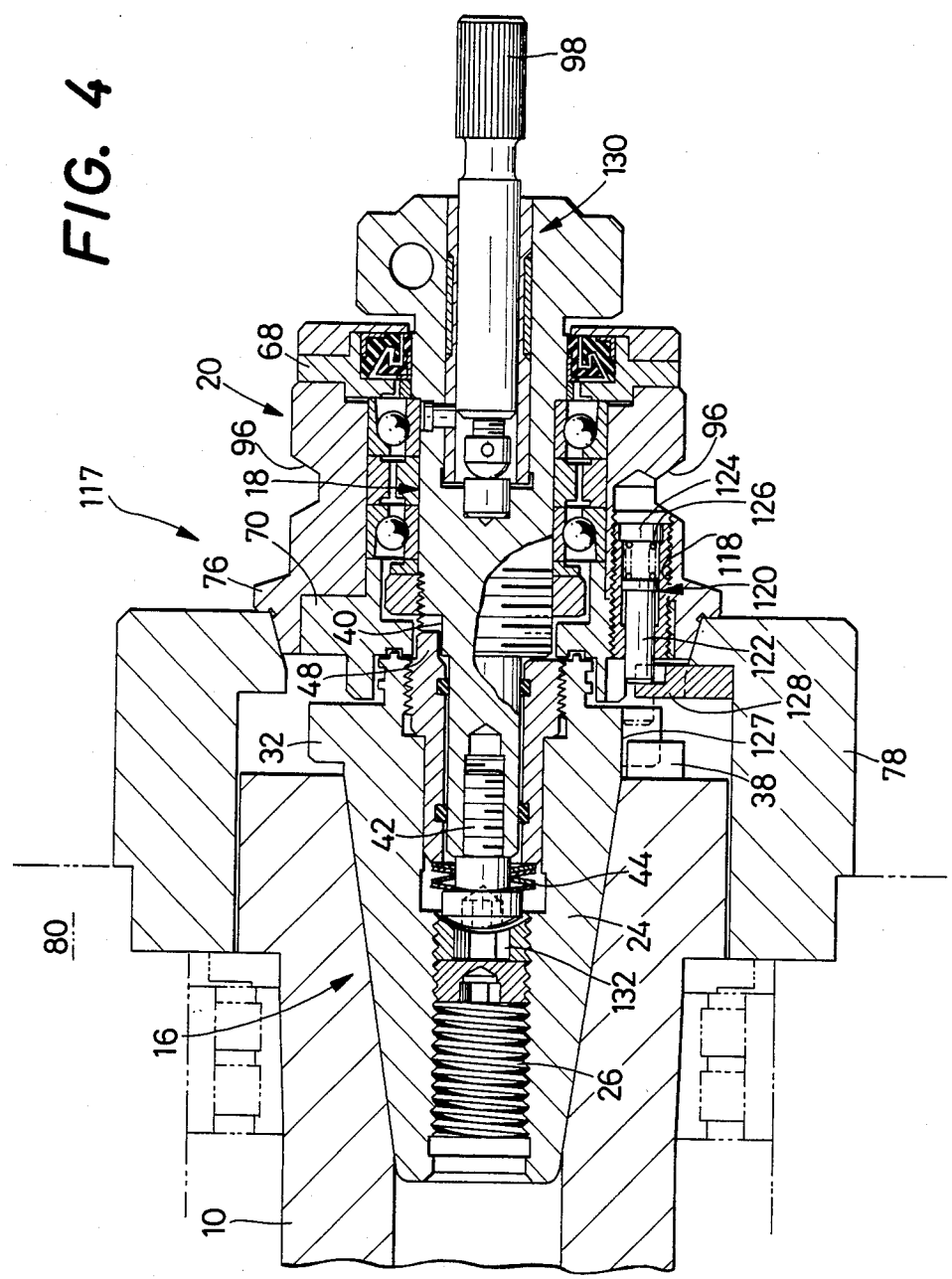
FIGS. 4 and 5 are views, corresponding to FIG. 1, of further embodiments of the invention.

FIG. 4 shows a further embodiment of a tool holder generally indicated at 117. This tool holder 117 employs a circumferential lock mechanism for preventing a relative rotation between the holder body 16 and the casing 20, which mechanism is different from that used in the first embodiment of FIG. 1.

In the end portion of the casing 20 opposite to the holder body 16, and in the adjacent bearing retainer 70, there is formed a threaded hole 118 which extends parallel to the centerline of the casing 20 and through the wall of a flange portion of the bearing retainer 70. In this threaded hole 118 is threaded a cylindrical hollow guide member 120 which has a relatively long, large-diameter bore, and a relatively short, small-diameter bore concentric and communicating with the large-diameter bore. The guide member 120 is disposed so that its small-diameter bore is on the side adjacent to the holder body 16. A projecting pin 122 is inserted in the large- and small-diameter bores such that the pin 122 is movable in sliding contact with the surface of the small-diameter bore. A compression coil spring 126 is interposed between one end of the projecting pin 122 and a spring seat 124 fixed to the end of the guide member 120 at which the large-diameter bore is open. The projecting pin 122 is thus biased at said one end thereof by the coil spring 126 toward its projected position at which the other end of the pin 122 projects a certain distance from the open end of the small-diameter bore of the guide member 120. The annular flange portion 32 of the shank member 24 of the holder body 16 has a cutout 127 which engages the boss 38 on the end face of the spindle 10. This cutout 127 is formed so that it also engages the projecting end of the projecting pin 122 while the pin 122 is located at its projected position. The positioning member 78 carries a stopper 128 which is fixed thereto for abutting engagement with the projecting end of the projecting pin 122 at the projected position. When the tool holder 117 is mounted on the spindle 10, the projecting pin 122 at its projected position is stopped by the stopper 128 and thereby pushed inwardly toward the guide member 120 against a resilient force of the coil spring 126, whereby the engagement of the pin 122 with the cutout 127 is released.

While the tool holder 117 with the above arrangement is not mounted on the spindle 10, the projecting pin 122 engages the cutout 127, and the holder body 16 and the casing 20 are held in a predetermined circumferential position relative to each other. The projected position of the pin 122 is shown in broken lines in FIG. 4. When the tool holder 117 is mounted on the spindle 10 while being gripped at the annular groove 96 by the tool changer arm gripper, the boss 38 on the spindle 10 engages the cutout 127 in the flange portion 32 of the shank member 24, and the protrusion 90 (not shown in FIG. 4) on the positioning member 78 engages the cutout 88 (not shown in FIG. 4) in the flange portion 76 of the casing 20. Simultaneously, the projecting pin 122 is brought into abutment on the stopper 128 and moved out of the cutout 127, whereby the holder body 16 is permitted to rotate relative to the casing 20. Thus, the projecting pin 122, coil spring 126, circuit 127, stopper 128, etc. constitute a circumferential lock mechanism for preventing a relative rotation between the holder body 16 and the casing 20. This mechanism makes it possible to mount and dismount the tool holder 117 on and off the spindle 10 by the tool changer arm of the machining center.

As the circumferential lock mechanism is constructed as discussed above, the coned disc springs 44 used in this alternative embodiment serve only the purposes of pressing the casing 20 onto the positioning member 78 and of coupling the rotatable shaft 18 to the torque member 28 while allowing a slight relative displacement of these two components 18, 28. Accordingly, a fairly reduced number of coned discs may suffice to constitute the springs 44 of this alternative embodiment, in comparison with the coned disc springs used in the first embodiment of FIG. 1.

The rotatable shaft 18 of the embodiment of FIG. 4 uses a hydraulic chuck to hold the reamer 98 as in the preceding embodiment of FIG. 3. Further, an inward movement of the rotatable shaft 18 is limited by a stop screw 132 threaded in the axial hole 26 in the shank member 24. While FIG. 4 does not show any means for pulling the holder body 16 into the spindle 10, the holder body is provided with a pull stud as used in the first embodiment of FIG. 1.

Figure 5:
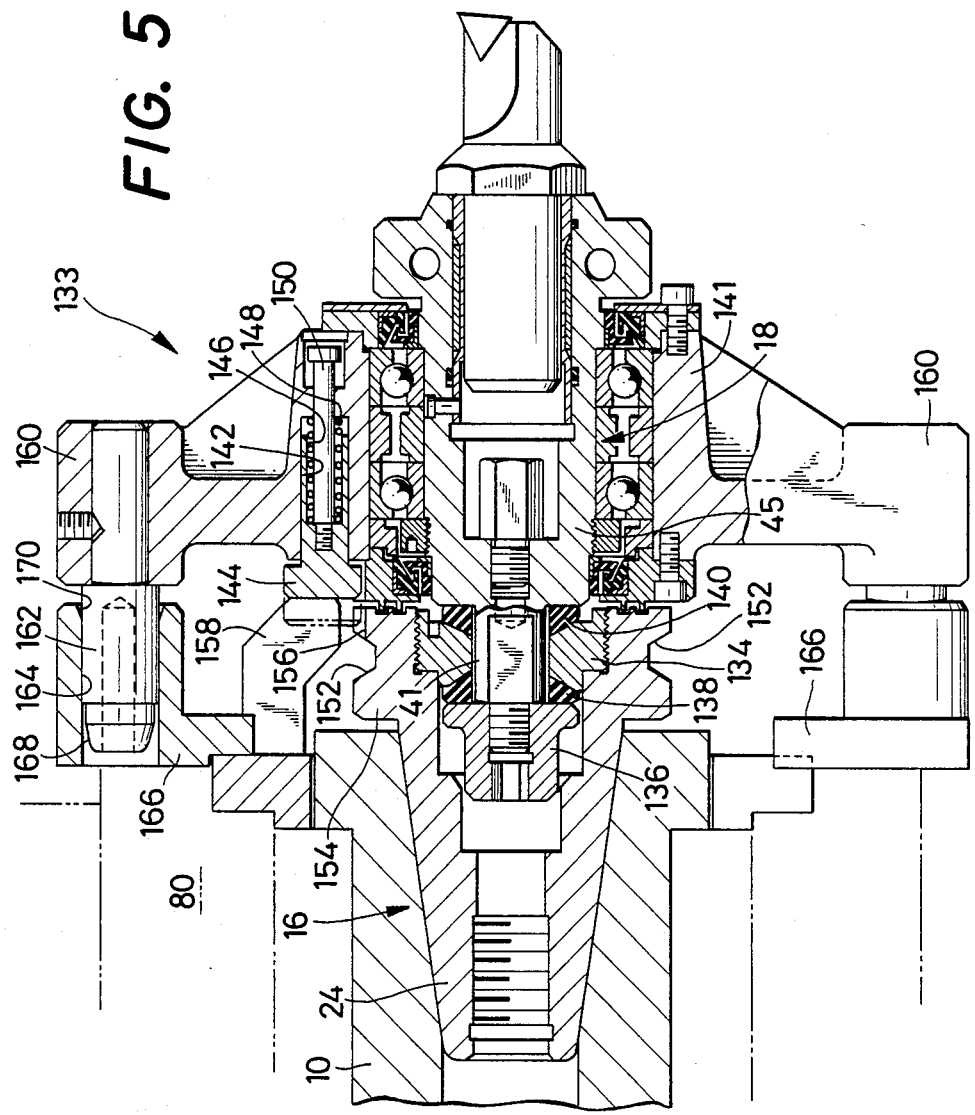

Another alternative embodiment of the invention is indicated generally at 133 in FIG. 5, wherein a torque member 134 is an annular member which has an axial thickness decreasing in a radially inward direction thereof. The small-diameter portion 41 of the rotatable shaft 18 extends concentrically through the annular torque member 134 with a slight radial clearance therebetween. An annular member in the form of a nut 136 is threaded on one end of the small-diameter portion 41 remote from the large-diameter portion 45. Between the torque member 134 and the nut 136, and between the torque member 134 and the large-diameter portion 45 of the shaft 18, there are disposed a pair of elastic rings 138, 140, respectively. That is, the elastic rings 138 and 140 are spaced by the torque member 134 from each other along the axis of the small-diameter portion 41. Each of the rings 138, 140 is formed of rubber so that it has an axial thickness which increases in a radially inward direction thereof. (The elastic ring 138, 140 may be replaced by a metal washer having a part-spherical surface.) That is, the elastic rings 138 and 140 have a configuration which is complementary in cross section with the torque member 134, as shown in FIG. 5. These elastic rings 138, 140 and the previously indicated radial clearance permit a slight displacement of the rotatable shaft 18 relative to the torque member 134. For preventing relative rotation between the rotatable shaft 18 and the torque member 134, or transmitting torque from the torque member 134 to the shaft 18, the small-diameter portion 41 of the shaft 18 is cut on its circumference to provide a pair of opposite flat surfaces parallel to each other so that the portion 41 has a double-D shape in cross section (obtained by replacing opposite short sides of a rectangle by a pair of circular arcs). In the meantime, the central through-hole in the torque member 134 through which the small-diameter portion 41 extends, is shaped so as to have a double-D cross sectional configuration (in the form of a flattened round broach) corresponding to the double-D profile of the small-diameter portion 41.

The tool holder 133 uses a casing 141 having a pin hole 142 which is parallel to the axis of the casing 141 and open toward the holder body 16. A projecting pin 144 engages the pin hole 142 slidably such that its head on one end thereof is held located outside the pin hole 142. The projecting pin 144 has an axial bore 146 which is open at the other end portion opposite to the head. The axial bore 146 accommodates a compression coil spring 148, by which the pin 144 is axially biased toward the holder body 16, that is, toward its projected position. A stop bolt 150 is screwed to the projecting pin 144 so as to limit a distance of projection of the pin 144 from the pin hole 142, i.e., to limit the projected position of the pin 144.

The shank member 24 includes a radial flange portion 154 of a large width which has in its outer surface an annular groove 152 for engagement with the gripper of the tool changer arm of the machining center. The radial flange portion 156 has a cutout 156 which engages the head of the projecting pin 144 located at its projected position. To the body 80 of the machining center is fixed a stopper 158 which, upon mounting of the tool holder 133 on the spindle 10, abuts on the head of the projecting pin 144 located at its projected position, thereby pushing the pin 144 into the pin hole 142. Thus, the engagement of the pin 144 with the cutout 156 is released when the tool holder 133 has been mounted on the spindle 10.

As described above, the projecting pin 144, coil spring 148, cutout 156, stopper 158, etc. constitute a circumferential lock mechanism for preventing a relatiave rotation between the holder body 16 and the casing 141, which is similar in operation and function to that used in the preceding embodiment of FIG. 4.

The casing 141 is provided with a pair of arms 160 which extend radially outwardly at diametrically opposite positions. Each of the arms 160 has an axial hole in which an engagement pin 162 is fixed such that the pin 162 extends parallel to the axis of the casing 141, and such that one end thereof on the side of the holder body 16 protrudes from the end face of the arm 160. Like the preceding embodiment, the tool holder 133 uses a positioning member 166 fixed to the body 80 of the machining center. The positioning member 166 has a pair of holes 164 which are engageable with the engagement pins 162 of the arms 160 for accurate positioning of the casing 141 when the tool holder 133 is mounted on the spindle 10. In the above arrangement, the engagement pins 162 and the mating holes 164 serve as first and second positioning means, respectively. Thus, the casing 20 functions to position the rotatable shaft 18 with high precision, irrespective of a slight misalignment of the holder body 16 relative to the spindle 10. For easy and smooth insertion of the engagement pins 162 into the corresponding holes 164, the pins 162 and the holes 164 are chamfered at 168 and 170, respectively.

While the present invention has been described in its preferred embodiments suitable for holding rotary cutting tools for a machining center, it is to be understood that the invention may be otherwise embodied.

For example, the invention may be embodied as tool holders for rotary cutting tools for use on drilling, boring or other special- or single-purpose machine tools. In this instance, it is not necessarily a requirement to provide such a circumferential lock mechanism as used in the illustrated embodiments for preventing a relative rotation between a holder body and a casing.

In the first embodiment of FIG. 1, the claw clutch comprising the recesses 92 and the dogs 94 is operated under action of the coned disc springs 44 which are provided to permit a relative axial movement between the casing 20 and the holder body 16. However, it is possible that one of the components of the claw clutch can be supported by the casing 20 or holder body 16 axially movably relative to the supporting member 20 or 16, and operated under action of another biasing means other than the coned disc springs 44.

Although the engagement pins 162 and the mating holes 164 of the embodiment of FIG. 5 are provided on or in the casing 141 and the positioning member 166, respectively, the pins 162 may be fixed to the positioning member 166 while the holes 164 may be formed in the casing 141. Further, the tapered surfaces 74 and 82 which are provided in the embodiment of FIG. 1 on the outer and inner circumference of the casing 20 and the positioning member 78, respectively, may be formed on the inner and outer circumference of the casing 20 and the positioning member 78, respectively. Further, the tapered surfaces 74 and 82 may be replaced by straight cylindrical surfaces.

In the tool holders 14, 117 and 133 of the illustrated embodiments, the holder body 16 has a tapered outer surface (taper shank) 22 for contact with the tapered inner surface (tapered bore) 36 of the spindle 10. However, this conventional tapered arrangement 22, 36 for mounting the tool holder is not a prerequisite. In this respect, the principle of the invention only requires that the holder body 16 be coupled to the spindle 10 so that a torque may be transmitted from the spindle 10 to the holder body 16.

It will be apparent that the illustrated tool holders 14, 117 and 133 may be used for holding drills or roughing tools (for cutting operations which will be followed by a finishing operation), as well as for holding tools for precision cutting, such as the fine-boring tool 12 and reamer 98.

It will be obvious that other changes and modifications may occur to those skilled in the art without departing from the scope of the invention defined in the appended claims.

What is claimed is:

1. A holder for holding a rotary cutting tool, attachable to a spindle of a machine tool for rotary cutting movement of the cutting tool by the spindle, said spindle having a longitudinal axis about which it is rotatable, and said machine tool having a substantially stationary body, the holder comprising:

a holder body fixed to the spindle for rotation therewith about the axis of the spindle;

a rotatable shaft disposed concentrically with said holder body and having a tool-mounting portion at one end thereof, said rotatable shaft further having an other end portion coupled to said holder body for receiving torque from said holder body, said rotatable shaft being axially and radially displaceable and inclinable relative to said holder body;

a positioning member fixedly disposed on the machine tool body radially outwardly of said spindle; and a cylindrical casing disposed radially outwardly of and rotatably engaged with said rotatable shaft such that said casing and said shaft are rotatable relative to each other, said casing being engageable with said positioning member for accurate positioning thereof by the positioning member, thereby flexibly connecting said rotatable shaft to said holder body while simultaneously accurately positioning said rotatable shaft with respect to the machine tool body when said holder body is fixed to said spindle.

2. A holder as set forth in claim 1, wherein said holder body comprises: (a) a shank member engageable with a bore formed in said spindle, and having an axially concentric hole formed therein; and (b) an annular torque member for transmitting torque from said shank member to said rotatable shaft, said torque member having a central through-hole, and being fixed in said axial hole of said shank member such that said central through-hole of the torque member is concentric with said axial hole of said shank member, said other end portion of the rotatable shaft including a small-diameter portion which extends through said central through-hole of said torque member with a slight radial clearance therebetween to allow a slight degree of inclination and radial displacement of an axis of said rotatable shaft with respect to an axis of said shank member.

3. A holder as set forth in claim 2, wherein said rotatable shaft is provided with at least two elastic rings which are disposed in said radial clearance in spaced-apart relation with each other along said axis of said small-diameter portion, such that said elastic rings are held in contact with an outer surface of said small-diameter portion and with an inner surface defining said central through-hole of said torque member.

4. A holder as set forth in claim 2, wherein said rotatable shaft further includes a large-diameter portion adjacent said smaller-diameter portion, and is provided with an annular member fixed to one end of said small-diameter portion remote from said large-diameter portion, said rotatable shaft being further provided with a pair of elastic rings spaced from each other along said axis of the small-diameter portion, one of said elastic rings being held in contact with said torque member and said large diameter portion, and the other of said elastic rings being held in contact with said torque member and said annular member.

5. A holder as set forth in claim 4, wherein said pair of rings have surfaces which are complementary with opposite end faces of said annular torque member.

6. A holder as set forth in claim 2, wherein said rotatable shaft further includes a large-diameter portion adjacent said small-diameter portion, said large-diameter portion having at least one cutout formed in one end face thereof opposite to said torque member in parallel to said axis of the rotatable shaft, said torque member including at least one protrusion engagable with said at least one cutout in said large-diameter portion, whereby the torque is transmitted from said shank member to said rotatable shaft via said torque member.

7. A holder as set forth in claim 2, wherein said small-diameter portion has a pair of opposite flat surfaces, and said central through-hole of said torque member has a cross sectional configuration which corresponds to and engageable with that of said small-diameter portion, whereby the torque is transmitted from said shank member to said rotatable shaft via said torque member.

8. A holder as set forth in claim 1, wherein biasing means is disposed between said holder body and said rotatable shaft to bias the holder body and the rotatable shaft toward each other along the axis of said rotatable shaft, said cylindrical casing engaging said positioning member before said holder body has been fixed in place in said spindle, said holder body being axially movable against a biasing force of said biasing means relative to said rotatable shaft so as to force said casing onto said positioning member.

9. A holder as set forth in claim 2, wherein said small-diameter portion of the rotatable shaft is provided with a bolt which is fixed to one end of the small-diameter portion and which extends in said axial hole in said shank member in an axial direction away from said one end of the small-diameter portion and has a head portion at a free end thereof, said small-diameter portion being further provided with biasing means which is disposed between said head portion of said bolt and said torque member, said biasing means biasing said torque member and said rotatable shaft toward each other along the axis of the rotatable shaft, said holder body being axially movable by a slight distance against a biasing force of said biasing means away from said rotatable shaft after said cylindrical casing has engaged said positioning member, whereby said casing is held in pressed engagement with said positioning member.

10. A holder as set forth in claim 9, wherein said biasing means comprises a plurality of coned disc springs through which said bolt extends.

11. A holder as set forth in claim 9, wherein a stop screw is threaded in said axial through-hole in said shank member, said stop screw abutting on said bolt to limit inward movement of said rotatable shaft.

12. A holder as set forth in claim 1, further comprising biasing means for biasing said holder body and said cylindrical casing toward each other along axes thereof, said casing and said positioning member having tapered surfaces which are complementary with each other, and further having opposite abutment faces which are perpendicular to the axis of said casing, said tapered surfaces engaging each other, and said abutment faces abutting on each other, with surface pressures produced by a resilient force of said biasing means after the holder has been attached to said spindle, whereby said cylindrical casing is positioned by said positioning member.

13. A holder as set forth in claim 12, wherein said cylindrical casing includes a tapered nose having an outer circumferential surface which is tapered such that an outside diameter thereof decreases in a direction toward said holder body, said positioning member having a tapered bore which is engageable with said tapered outer circumferential surface of said tapered nose of the cylindrical casing.

14. A holder as set forth in claim 1, wherein said cylindrical casing is provided with a plurality of first positioning means which are spaced from each other circumferentially about said casing, said positioning member being provided with a plurality of second positioning means which are disposed radially outwardly of said spindle and which are engageable with said plurality of first positioning means for positioning of said casing when the holder is attached to said spindle.

15. A holder as set forth in claim 14, wherein said plurality of first positioning means comprises a plurality of engagement pins fixed to said casing and extending along the axis of the casing, and said plurality of second positioning means comprises a plurality of holes engageable with said plurality of engagement pins.

16. A holder as set forth in claim 1, wherein said holder body includes an annular flange portion extending radially outwardly from an outer circumferential surface at one end portion of the holder body to which said rotatable shaft is coupled, said annular flange portion having a cutout formed therein, and wherein said spindle has a boss formed on an end face thereof which is engageable with said cutout in said flange portion of the holder body when the holder is attached to said spindle, thereby to prevent relative rotation between said spindle and said holder.

17. A holder as set forth in claim 1, wherein said cylindrical casing includes an annular flange portion extending radially outwardly from an outer circumferential surface at one end of the casing opposite to said holder body, said annular flange portion having a cutout formed therein, and wherein said positioning member has a protrusion formed on an end face thereof which is engageable with said cutout in said flange portion of the casing when the holder is attached to said spindle, thereby to prevent relative rotation between said positioning member and said casing.

18. A holder as set forth in claim 1, wherein said tool-mounting portion of the rotatable shaft has a tool-insertion hole formed along an axis of the rotatable shaft, said tool-insertion hole accommodating a shank of the rotary cutting tool for fixation thereof to the rotatable shaft.

19. A holder as set forth in claim 18, wherein said tool-mounting portion of the rotatable shaft is provided with a sleeve fitting in said tool-insertion hole, said sleeve having, in an axially intermediate portion thereof, a thin-walled portion which cooperates with an inner surface of said tool-insertion hole to define a hydraulic chamber, said thin-walled portion being pushed radially inwardly upon increase in pressure in said hydraulic chamber, whereby said shank of the cutting tool is gripped by said thin-walled portion of the sleeve.

20. A holder for holding a rotary cutting tool, attachable to a spindle of a machine tool for rotary cutting movement of the cutting tool by the spindle, said spindle having a longitudinal axis about which it is rotatable, and said machine tool having a substantially stationary body, the holder comprising:
  a holder body fixed to the spindle for rotation therewith about the axis of the spindle;
  a rotatable shaft disposed concentrically with said holder body and having a tool-mounting portion at one end thereof, said rotatable shaft further having an other end portion coupled to said holder body for receiving torque from said holder body, said rotatable shaft being axially and radially displaceable and inclinable relative to said holder body;
  a positioning member fixedly disposed on the machine tool body radially outwardly of said spindle;
  a cylindrical casing disposed radially outwardly of and rotatably engaged with said rotatable shaft such that said casing and said shaft are rotatable relative to each other, said casing being engageable with said positioning member for accurate positioning thereof by the positioning member, thereby flexibly connecting said rotatable shaft to said holder body while simultaneously accurately positioning said rotatable shaft with respect to said machine tool body when said holder body is fixed to said spindle; and
  a circumferential lock mechanism for locking said cylindrical casing and said holder body to prevent relative rotation between said casing and said holder body when the holder is not attached to said spindle, and for allowing said relative rotation after said holder has been attached to said spindle.

21. A holder as set forth in claim 20 wherein said circumferential lock mechanism comprises a claw clutch disposed between said casing and said holder body, and further comprises biasing means for biasing said casing and said holder body toward each other along axes thereof so as to engage said claw clutch when the holder is not attached to said spindle, said biasing means permitting said claw clutch to be disengaged when the holder has been attached to said spindle.

22. A holder as set forth in claim 21 wherein said claw clutch comprises a plurality of recesses formed in an annular member fixed to one end of said casing opposite to said holder body, and further comprises a plurality of engagement dogs provided on an end face of said holder body opposite to said one end of said casing, said engagement dogs being held in engagement with said recesses by a biasing force of said biasing means when the holder is not attached to the spindle.

23. A holder as set forth in claim 21, wherein said holder body comprises: (a) a shank member engageable with a bore formed in said spindle, and having an axially concentric hole formed therein; and (b) an annular torque member for transmitting torque from said shank member to said rotatable shaft, said torque member having a central through-hole, and being fixed in said axial hole of said shank member such that said central through-hole of the torque member is concentric with said axial hole of said shank member, said other end portion of the rotatable shaft including a small-diameter portion which extends through said central through-hole of said torque member with a slight radial clearance therebetween to allow a slight degree of inclination and radial displacement of an axis of said rotatable shaft with respect to an axis of said shank member.

24. A holder as set forth in claim 23 wherein said small-diameter portion of the rotatable shaft is provided with a bolt which is fixed to one end of the small-diameter portion and which extends in said axial hole in said shank member in an axial direction away from said one end of the small-diameter portion and has a head portion at a free end thereof, said small-diameter portion being further provided with biasing means which is disposed between said head portion of said bolt and said torque member, said biasing means biasing said torque member and said rotatable shaft toward each other along the axis of the rotatable shaft, said holder body being axially movable by a slight distance against a biasing force of said biasing means away from said rotatable shaft after said cylindrical casing has engaged said positioning member, whereby said casing is held in pressed engagement with said positioning member.

25. A holder as set forth in claim 20 wherein said circumferential lock mechanism comprises: (a) a pin which is supported in a radially outer portion of said cylindrical casing such that said pin is slidable along an axis of said casing; (b) a spring acting on one end of said pin to bias the pin toward a projected position thereof at which the other end thereof engages said holder body when the holder is not attached to the spindle; and (c) a stopper which abuts on said other end of said pin at said projected position in order to disengage said pin from said holder body when the holder is attached to the spindle.

26. A holder as set forth in claim 25 wherein said holder body includes an annular flange portion extending radially outwardly from an outer circumferential surface at one end portion of the holder body to which said rotatable shaft is coupled, said annular flange portion having a cutout formed therein, said other end of said pin at said projected position engaging said cutout in said annular flange portion.

27. A holder as set forth in claim 25, wherein said spindle has a boss formed on an end face thereof which is engageable with said cutout in said flange portion of the holder body when the holder is attached to said spindle, thereby to prevent relative rotation between said spindle and said holder body.

28. A holder as set forth in claim 25, wherein said stopper is fixed to said positioning member.

* * * * *